(12) United States Patent
White et al.

(10) Patent No.: US 12,364,182 B2
(45) Date of Patent: Jul. 22, 2025

(54) ENHANCED MANAGEMENT ZONES FOR PRECISION AGRICULTURE

(71) Applicants: SoilMetrix, Inc., Research Triangle Park, NC (US); North Carolina State University, Raleigh, NC (US); Iowa State University Research Foundation, Inc., Ames, IA (US)

(72) Inventors: Jeffrey G. White, Raleigh, NC (US); Bradley A. Miller, Ames, IA (US); Julianne Bielski, Durham, NC (US)

(73) Assignees: SOILMETRIX, INC., Durham, NC (US); IOWA STATE UNIVERSITY RESEARCH FOUNDATION, INC., Ames, IA (US); NORTH CAROLINA STATE UNIVERSITY, Raleigh, NC (US)

(*) Notice: Subject to any disclaimer, the term of this patent is extended or adjusted under 35 U.S.C. 154(b) by 0 days.

(21) Appl. No.: 18/223,620

(22) Filed: Jul. 19, 2023

(65) Prior Publication Data

US 2023/0354734 A1    Nov. 9, 2023

Related U.S. Application Data

(63) Continuation of application No. 16/887,580, filed on May 29, 2020, now Pat. No. 11,744,168, which is a
(Continued)

(51) Int. Cl.
G06F 17/00 (2019.01)
A01B 79/00 (2006.01)
(Continued)

(52) U.S. Cl.
CPC ........ *A01B 79/005* (2013.01); *G06F 16/2458* (2019.01); *G06F 16/29* (2019.01);
(Continued)

(58) Field of Classification Search
CPC ... A01B 79/005; G06F 16/2458; G06F 16/29; G06N 3/08; G06N 3/09; G06N 20/00;
(Continued)

(56) References Cited

U.S. PATENT DOCUMENTS

| 8,719,217 B1 | 5/2014 | Vivalda |
| 10,719,638 B2 | 7/2020 | Xu |

(Continued)

OTHER PUBLICATIONS

International Search Report and Written Opinion dated Nov. 17, 2022 from related International Patent Application No. PCT/US2021/035039.

*Primary Examiner* — Greta L Robinson
(74) *Attorney, Agent, or Firm* — SHUTTLEWORTH & INGERSOLL, PLC; Jason R. Sytsma (57) ABSTRACT

The present invention is a system and method for agricultural management-zone delineation to be done over broad geographic extents without overly-localized field-specific data. The instant innovation guides precision agricultural sampling and management by delineating enhanced management zones based upon remote sensing and artificial intelligence and combining the two with data derived from an existing countrywide soil survey database. In an embodiment, the instant innovation uses artificial intelligence from multiple sources to provide granular zone detail. Output of the present innovation can be aggregated to produce management zone sizes that have a level of uncertainty compatible with the needs of the customer-fanner and implementable given the capabilities of available equipment.

7 Claims, 4 Drawing Sheets

Related U.S. Application Data continuation-in-part of application No. 16/699,292, filed on Nov. 29, 2019.

(60) Provisional application No. 62/772,238, filed on Nov. 28, 2018.

(51) Int. Cl.
    *G06F 16/2458*     (2019.01)
    *G06F 16/29*     (2019.01)
    *G06N 3/08*     (2023.01)
    *G06V 10/764*     (2022.01)
    *G06V 20/10*     (2022.01)
    *G06V 20/13*     (2022.01)

(52) U.S. Cl.
    CPC ............ *G06N 3/08* (2013.01); *G06V 10/764* (2022.01); *G06V 20/13* (2022.01); *G06V 20/188* (2022.01)

(58) Field of Classification Search
    CPC .... G06V 10/764; G06V 20/13; G06V 20/188; G06V 20/194
    See application file for complete search history.

(56) References Cited

U.S. PATENT DOCUMENTS

| | | | |
|---|---|---|---|
| 11,457,554 B2 * | 10/2022 | Mota Manhaes | G06Q 50/02 |
| 11,744,168 B2 * | 9/2023 | White | G01S 17/89 |
| | | | 382/110 |
| 2006/0025971 A1 | 2/2006 | Detwiler | |
| 2016/0232621 A1 | 8/2016 | Ethington | |
| 2018/0046735 A1 | 2/2018 | Xu | |
| 2018/0075545 A1 | 3/2018 | Richt | |
| 2018/0132423 A1 | 5/2018 | Rowan | |
| 2018/0211156 A1 | 7/2018 | Guan | |
| 2018/0293671 A1 | 10/2018 | Murr | |
| 2018/0349520 A1 | 12/2018 | Bhalla | |
| 2019/0066234 A1 | 2/2019 | Bedoya | |
| 2020/0163272 A1 | 5/2020 | White | |

\* cited by examiner

ENHANCED MANAGEMENT ZONES FOR PRECISION AGRICULTURE

This application is a continuation of U.S. patent application Ser. No. 16/887,580 filed May 29, 2020, which application is a Continuation-In-Part of U.S. patent application Ser. No. 16/699,292 filed Nov. 29, 2019, which application claimed the benefit of Provisional Application No. 62/722,238 filed Nov. 28, 2018, which are hereby incorporated by reference in their entirety.

BACKGROUND

In order to coax increased yield from agricultural plots under their control, farmers have in recent years turned to "precision agriculture" to differentiate areas with varying degrees of fertility or other properties within individual fields, and to determine best practices for targeting fertilizer applications and other management on a site-specific basis. This site specific application is enabled by variable rate technology (VRT): precision agriculture equipment to apply inputs such as fertilizer and soil amendments at different rates within a field based on the spatial variability of soil, crops, etc. One approach to precision agriculture is to delineate "management zones" within an individual field. A management zone is an area within a field that has within it similar characteristics amenable to common management and different from that within other similarly delineated zones in the field.

Commonly practiced "precision agriculture" makes use of the U.S. Department of Agriculture (USDA) Natural Resources Conservation Service's Soil Survey Geodatabase (SSURGO). The data resident in SSURGO, while providing a useful approximation of soil conditions, was never intended by its originators to be used to guide precision agriculture or develop agricultural management zones within a field.

Other management zone delineation techniques tend to be localized and field-specific, relying on older technology such as proximal sensing (in the case of soil electrical conductivity), visual pattern recognition based upon a small sample (sometimes with a sample size of merely one) of satellite images, topographic analysis, grid soil sampling, crop yield monitor data, and farmer and/or consultant knowledge.

BRIEF DESCRIPTION OF THE DRAWINGS

Certain illustrative embodiments illustrating organization and method of operation, together with objects and advantages may be best understood by reference to the detailed description that follows taken in conjunction with the accompanying drawings in which.

DETAILED DESCRIPTION

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language).

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases in various places throughout this specification are not necessarily all referring to the same embodiment. Furthermore, the particular features, structures, or characteristics may be combined in any suitable manner in one or more embodiments without limitation.

Reference throughout this document to "SSURGO" indicates the U.S. Department of Agriculture Natural Resources Conservation Service's Soil Survey Geodatabase.

Reference herein to "DEM" or the plural, "DEMs" indicates "digital elevation model" or "digital elevation models."

Reference herein to "STM" indicates "soil terrain model."

Reference herein to "remote sensing" indicates the human and machine acquisition of information without physical contact and includes aerial and satellite imagery and light detection and ranging (hereinafter, "LIDAR").

Reference herein to learning systems such as "Artificial Intelligence" and/or "Deep Learning" indicates data analysis through the use of statistics, classification algorithms, artificial neural networks, machine learning, and/or feature recognition or pattern recognition.

Reference herein to "zone" or "zones" indicates one or more geospatial areas that adhere to pre-established agricultural criteria, such criteria, in a non-limiting example, being as simple as latitudinal and longitudinal coordinates describing the metes and bounds of the zone, or as complex as adherence to particular yield and soil variability conditions.

Reference herein to "variable rate technology" indicates technology that enables a grower to apply different or different rates of agricultural inputs and management to various spatially defined areas, by way of non-limiting example, management zones, within an individual field.

Reference to "ground truth" indicates the collection of past data regarding crop varieties planted, soil test results, past applied fertilizers and soil amendments, and actual yields from the planted area for each crop which presents a true picture of the management and yields of a particular geographical area.

In order to maximize crop yield, farmers have for millennia sought to better understand not just the conditions in which their plants best perform, but the conditions provided to their crops by the fields in which the seeds of such plants are sown. Clearly, a farmer who best matches field conditions to crop needs can be more assured of maximizing or at least, increasing, crop yield.

Recent Precision Agriculture techniques have used technologies to develop crop management-zone identification and delineation that is overly localized and field specific. The soil-landscape paradigm of traditional soil mapping recognizes five factors influencing the spatial distribution of soil: climate, organisms, relief, parent material, and time. The most detailed sources of information about the soil parent material, or surficial geology, are the soil survey maps published by the USDA-NRCS (SSURGO). While useful tools in their day, the soil survey maps alone do not contain the level of detail necessary to assure farmers state-of-the-art yields.

Consequently, there is a need for an agricultural technology that allows management zone delineation to be done over broad geographic extents in the absence of overly-localized field-specific data. While in an embodiment the instant innovation utilizes the parent material information from SSURGO as an input data layer, it further uses other data sources to account for other yield-correlated factors. In a further embodiment, the instant innovation uses a reiterative artificial intelligence process with data from multiple sources to provide granular zone detail.

The instant innovation guides precision agricultural sampling and management by delineating enhanced management zones over broad geographic extents based upon remote sensing, pattern recognition, and artificial intelligence capability comprised of machine learning and statistical analysis, and combining them all with data derived from an existing countrywide soil survey database. By delineating enhanced management zones, it is possible for a farmer to substantially reduce the number of soil samples needed to develop prescriptions for soil amendments such as lime and fertilizer. These zones are similarly well suited for the selection of crop varieties developed for different soil environments. Enhanced management zones can also be useful in guiding measures to control weeds, insect pests, and crop diseases. In addition, such zones may prove useful in non-agricultural land management such as forestry and natural resource conservation.

In an embodiment, the instant innovation combines the utilization of topographic and spectral information. Multi-scale terrain derivatives are generated from high-resolution DEMs based on aerial LIDAR. These digital terrain derivatives include but are not limited to slope gradient, relative elevation, profile curvature, and plan curvature. In addition, multi-temporal, multi/hyper-spectral, satellite and aerial imagery is compiled. Extant vegetation and soil indices are calculated from the spectral bands of such imagery. These indices are mathematical combinations of imagery bands that have historically proven useful in characterizing vegetation and soils. The multiple terrain derivatives created at different analysis scales are used as geospatial layers parallel to the spectral layers in the process of identifying management zones and predicting soil properties. The soil properties include all identified co-variants.

In an embodiment, a hyper-dimensional data-cube may be formed to provide input to the analytical and machine learning processes of the predictive system. The hyper-dimensional data-cube may be formed in different aspects based upon the sensor, imagery, ground truth, analytical index, soil parent, and digital terrain analysis data utilized in the formation of the hyper-dimensional data-cube. In one or more non-limiting examples, a hyper-dimensional data-cube may be formed utilizing sensor data from remote sensing of field conditions creating multi-scale digital terrain analysis data combined with soil parent material data input from SSURGO. Alternatively, the hyper-dimensional data-cube may be formed utilizing imagery band data from satellite and other imaging systems combined with calculated vegetation and soil indices. Yet another hyper-dimensional data-cube may be formed through the utilizing sensor data from remote sensing of field conditions creating multi-scale digital terrain analysis data combined with soil parent material data input from SSURGO and utilizing imagery band data from satellite and other imaging systems combined with calculated vegetation and soil indices to create a multi-spectrum data-cube. Each data cube may be used by the system to predict soil zone attributes and provide recommendations for crop planting, zone management, and soil maintenance.

In a non-limiting example, the data cube may be used as input to ISODATA utilized by the system and to train artificial intelligence algorithms to predict and/or estimate certain agronomic parameters. The predicted and/or estimated agronomic parameters are combined with ground truth to delineate a set of optimized management zones.

In an embodiment, an unsupervised classification algorithm will be used for zone delineation: given multi-scale terrain and multi-spectral layers (e.g. the data cube) of some agricultural field of interest layered with parent material data, the algorithm will delineate different agricultural zones based on common within-zone data characteristics. The zones can be characterized by relative yield and yield stability and/or variability in georeferenced soil sample test data. Because the input data is continuous in nature, the prediction of soil properties and/or yield is treated as a regression problem and a fully-connected neural network is used.

In an embodiment, Artificial Intelligence (AI) (in a non-limiting example, such as pattern recognition) is applied to the georeferenced crop yield and soil test data to delineate preliminary management zones based on the data cube, regardless of the data-cube aspect employed by the AI process. Zone delineation is optimized based on a variable zone size. In a non-limiting example, the optimized zone size may be the grower's desired minimum zone size. Zone size for each individual grower may be calculated as a function of the minimum area that the grower can or intends to manage using variable rate technology. The variable rate technology enables the grower to apply different type or different rates of agricultural inputs and soil management techniques to various spatially defined areas, which may be referred to as "management zones", within an individual field. The zone delineation for each grower may thus be different based upon a combination of the preferred zone size a grower wishes to work with and the management zones predicted and recommended by the artificial intelligence algorithm. Such optimization further delineates minimum variability within zones and maximal variability between and among zones.

Python tooling has become very popular in machine learning and the instant innovation will make use of those tools during neural network development for the creation of zone attributes and soil management recommendations. Tools like Pandas, Numpy, TensorFlow, and Keras are a few concrete examples of libraries with full support for constructing a neural network and performing the parallelized mathematical operations needed to realize the output model that provides the optimized output for a grower.

Neural Networks are a type of supervised artificial intelligence (as opposed to unsupervised) that use labeled data: for each input sample, there will be a corresponding output value also called "ground truth". The input and output, called the Training Set, are related by mathematical equations with unknown coefficients that the network within any embodiment of the instant innovation must learn. Human trainers supervise the operation of the Neural Network and provide the guidance necessary for the Neural Network to identify and learn the coefficients of the mathematical equations to produce usable results.

Human supervision is utilized to determine how well the network is learning as it iterates over the input and corrects itself against the output during training. At this phase, architectural changes are made to the network to improve its performance. When a human network designer determines that the accuracy against the Training Set is sufficient, the network is then tested against the Development Set, a small set of data separated out of the Training Set up front, prior to any training activities. If the accuracy of the output against the Development Set is determined to be not sufficient, its tuning parameters (called hyper-parameters) can be adjusted and the network re-run against the Development Set iteratively until accuracy improves. Finally, the network runs against the "Test Set" data, where overfitting and underfitting to the Development Set by the model can be determined, and another set of tuning adjustments performed to better generalize or better specialize respectively, the model.

In an embodiment, the instant innovation will use a fully-connected neural network for regression, one network per soil property. The training set is derived from the data cube regardless of the data cube aspect employed. The values will be scaled to normalize the data values, and each input sample will correspond to one soil test point. The corresponding ground truth for each soil test point may be the value of the soil property taken from that same location. All data layers will share the same geographic coordinate system and projection. During development, the corresponding ground truth labels will be based on the inspection of actual yield monitor and georeferenced soil sample test data collected from the same location, if such data are available from a customer. Finally, the Training, Development, and Test sets will be assigned. Target accuracy for the network may be set based on customer feedback. From there, the iterative process previously described may take place. The final product, the Rx Maker model, will consist of the final network architecture, the learned parameters, the learning rate, hyper-parameter values, and any heuristics (e.g. Regularization) that may need to be applied for reducing bias and variance error.

In such embodiments, resulting predictions of soil properties can be made at infinitely high resolution; however, as resolution increases, so does uncertainty regarding the accuracy of the predictions. In a non-limiting example, as the management zone size increases, the heterogeneity of the zone may increase, but the increased prediction range reduces the uncertainty of the respective predictions of soil properties. In a commercial setting, model output will be aggregated to produce management zone sizes that have a level of uncertainty compatible with the needs of the farmer and implementable with the capabilities of the farmer's equipment.

Aggregation of model output will be achieved, at least in part, using spatial generalization techniques. These include, but are not limited to, algorithms that dissolve zone boundaries. Dissolving zone boundaries facilitates smoothing ragged zone edges and melding small zone patches and/or inclusions with larger surrounding zones. Smoothing ragged zone edges and melding small zones or inclusions into larger surrounding zones may permit the system to associate the soil property predictions of the larger zone across the combined zones comprised of the larger zone and one or more smoothed ragged zones or zone patches and inclusions. In this manner, dissolving zone boundaries may create an aggregated zone comprised of a large zone and one or more zone patches and/or inclusions.

In a non-limiting example generalization tools provided by the ArcGIS tool set provided by ESRI may be utilized to achieve such zone smoothing. Generalization tools may include, but are not limited to, the Aggregate, Boundary Clean, Expand, Majority Filter, Nibble, Region Group, Shrink, and Thin tools.

Optimization of agricultural zones may be created through the use of each of the data-cube aspects previously discussed. A first solution may be realized through applying a first hyper-dimensional data-cube comprising sensor data from remote sensing of field conditions creating multi-scale digital terrain analysis data combined with soil parent material data input from SSURGO as input to one or more learning algorithms, where the learning algorithms are either supervised or unsupervised. Alternatively, a second solution may be realized through applying a hyper-dimensional data-cube formed utilizing imagery band data from satellite and other imaging systems combined with calculated vegetation and soil indices, once again as input the one or more supervised or unsupervised learning algorithms. A third solution may be realized another hyper-dimensional data-cube may be formed through the utilizing sensor data from remote sensing of field conditions creating multi-scale digital terrain analysis data combined with soil parent material data input from SSURGO and utilizing imagery band data from satellite and other imaging systems combined with calculated vegetation and soil indices to create a multi-spectrum data-cube as input to the one or more supervised or unsupervised learning algorithms. The system may be requested to create zone attributes, soil predictions, and management recommendations utilizing each aspect of the hyper-dimensional data-cube as input. The system may then produce three solutions, one from each sub-process utilizing the first, second, or third data-cube aspect. By employing three sub-processes to delineate optimized agricultural zones, the instant innovation internally vets its results for maximum optimization. Results of the three parallel zone delineation strategies utilizing the three aspects of the data-cube as input are compared against one another and the optimal enhanced management zone and recommendation data may be provided to the client. Optimization is achieved through determination of the data-cube that best leads to prediction of any particular parameter of interest where the input parameter of interest is supplied by a grower or farm management entity.

In a non-limiting example, a system and method for optimizing agricultural zone attributes, zone predictions, and recommendations comprises at least having a data processor in communication with a data server that is in data communication with a user device that is capable of displaying data representations to a user. Utilizing any one of three data-cube aspects the system may construct a first dataset using remote sensing and digital analysis,
    construct a second dataset using collected imagery bands and calculated indices, and/or construct a third dataset using a combination of inputs to the first dataset and the second dataset. The system may then apply artificial intelligence algorithms to the first dataset and output a first set of zone attributes, apply artificial intelligence algorithms to the second dataset and output a second set of zone attributes, and apply artificial intelligence algorithms to the third dataset and output a third set of zone attributes. To determine the optimum set of zone attributes the system may compare the first, second, and third sets of zone attributes in light of the one or more parameters input by the user as guidance. The system may then deliver an optimized set of zone attributes and one or more zone management recommendations to the user where the set of zone attributes present the recommendation of zone attributes and/or zone management that optimize the results for the one or more parameters input by the grower or farm management entity.

Figure 1:
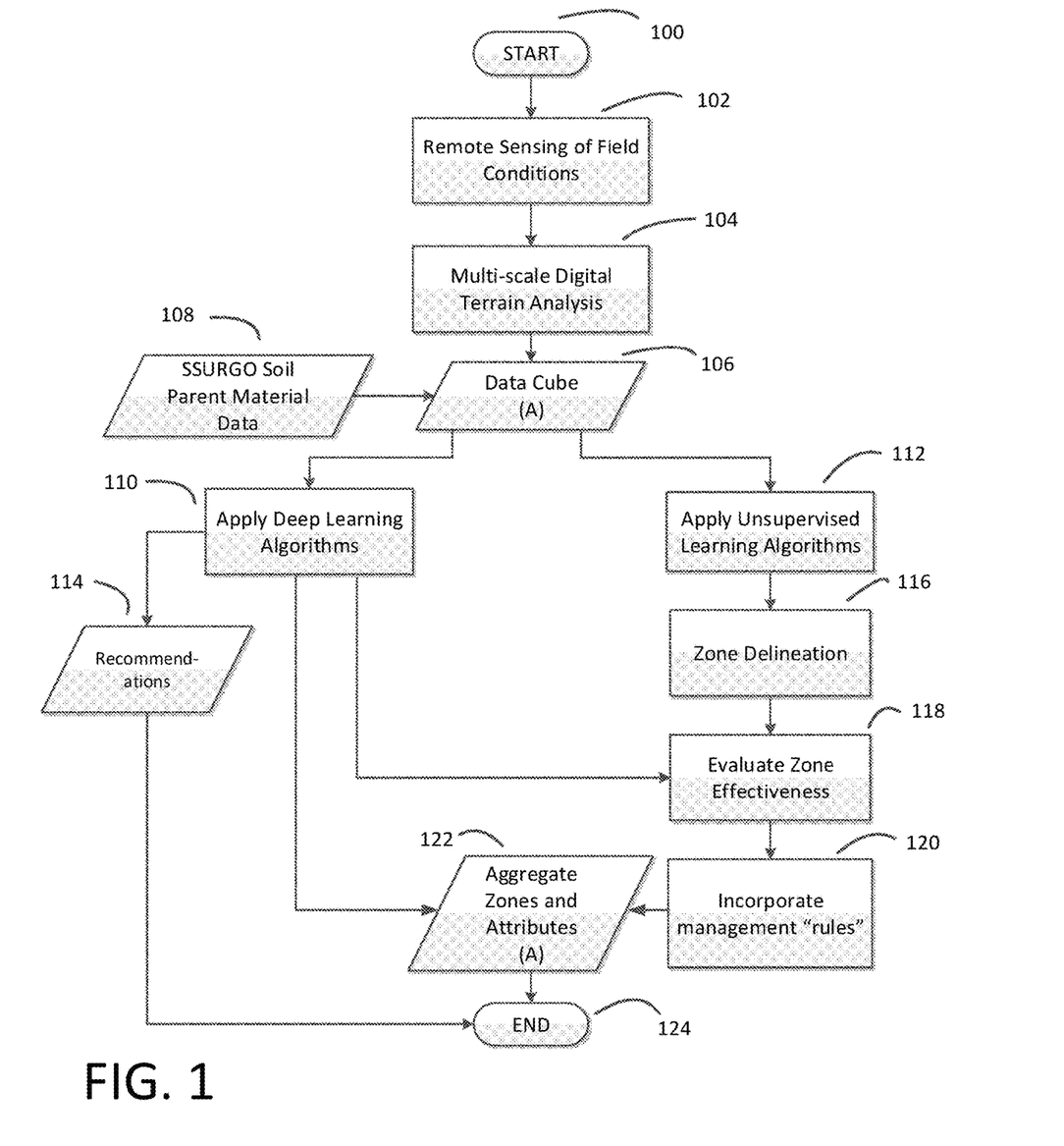
FIG. 1 is a first process-flow diagram showing the reduction of Zone Attributes and Prescription Recommendations consistent with certain embodiments of the present invention.

Turning now to FIG. 1, a first process-flow diagram showing the reduction of Zone Attributes and Prescription Recommendations consistent with certain embodiments of the present invention is shown. The sub-process of FIG. 1 begins at 100. Remote Sensing of Field Conditions 102 is performed via aerial LIDAR, in a non-limiting example. Digital Elevation Models (DEMs) based upon the LIDAR data are subjected to Multi-scale Digital Terrain Analysis (DTA) at 104, which yields a number of attributes including, by way of non-limiting example, SLOPE CURVATURE. These attributes are to be used in subsequent steps. The DTA data are compiled in the Data Cube (A) 106, along with input Soil Parent Material Data 108. The compilation of data is used to train an artificial intelligence Deep Learning Algorithm at 110 to predict or estimate georeferenced crop yield and soil test parameters. The application of Deep Learning Algorithm at 110 produces Prescription Recommendations, typically in the non-limiting format example of a table or map at 114. The application of Deep Learning Algorithm at 110 also produces Zone Attributes (A) to aggregate zones and attributes of zones at 122. The compiled data of Data Cube (A) 106 along with Soil Parent Material Data 108 are also subject to an artificial intelligence unsupervised classification learning algorithm 112 and processed in order to delineate preliminary Zones at 116. Zone delineation effectiveness at 118 is evaluated based on how well the Zones capture the spatial variability in georeferenced soil-test data and crop yield. Zone delineation effectiveness at 118 may be calculated using real ground truth empirical provable data. Alternatively, Zone effectiveness delineation at 118 may be calculated using Deep Learning output from the application of Deep Learning Algorithms at 110. Zone delineation based on SSURGO map-units is also evaluated. Best among all candidate delineations are those that: 1) maximize the total number of statistically different zones for each soil or crop parameter in question (by way of non-limiting example, the instant innovation may be used to make parameter-specific maps, such as a map for phosphorus that is different from a map for potassium, which in turn will be different from a map for organic matter, etc.); 2) maximize inter-zone differences in these parameters; and 3) minimize the sum of area-weighted within-zone variances. The data for these evaluations are actual georeferenced soil-test and yield data when available. When not available, the predictions from the artificial intelligence prediction algorithm are used. "Virtual agronomic effectiveness" of a delineation is based on the extent to which inter-zone differences are great enough to warrant differential variable-rate management. These judgements are made based on: 1) the likelihood of a response to differential management that is within the capabilities of the grower's variable rate application equipment; and 2) grower preferences. The system incorporates management "rules" at 120, and derives Aggregated Zone Attributes (A) for smoothed and aggregated zones that are consistent with the pre-established management rules at 122. The sub-process ends at 124.

Figure 2:
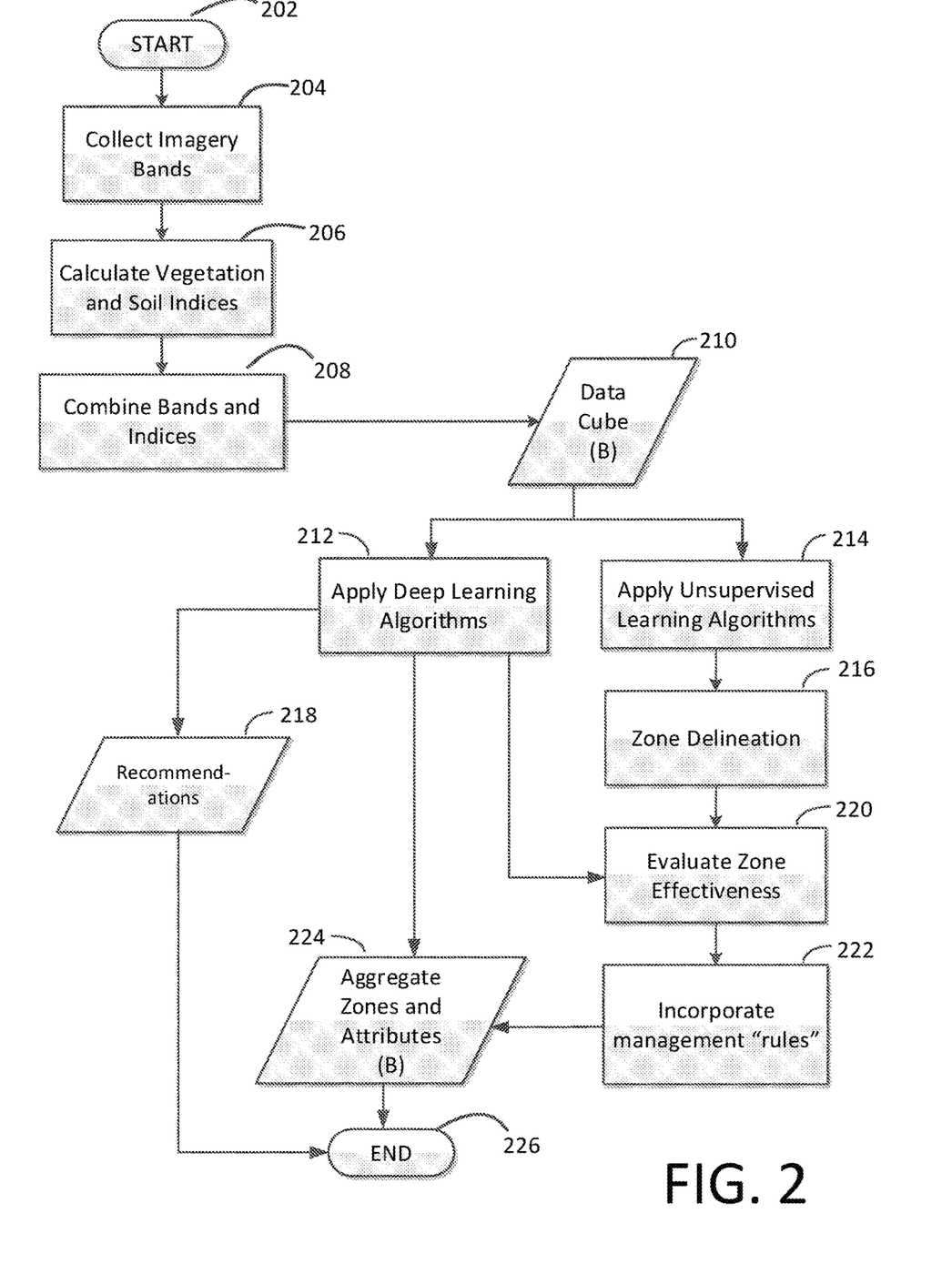
FIG. 2 is a second process-flow diagram showing the reduction of Zone Attributes and Prescription Recommendations consistent with certain embodiments of the present invention.

Turning now to FIG. 2, a second process-flow diagram describing the reduction of input imagery and index data to Zone Attributes and Prescription Recommendations consistent with certain embodiments of the present invention is shown. The sub-process of FIG. 2, which may operate in parallel with the sub-process of FIG. 1, begins at 202. At 204, multi-temporal, multispectral satellite and aerial imagery bands are collected. At 206 extant vegetation and soil indices are calculated from the collected spectral bands. The indices are mathematical combinations of imagery bands that have proven useful in characterizing vegetation and soil. At 208 the spectral imagery bands and calculated indices are combined into the Data Cube (B) 210. Data Cube (B) 210 compiled data are input to at least Deep Learning Algorithms 212 and Unsupervised Learning Algorithms 214.

The compilation of data is used to train an artificial intelligence Deep Learning Algorithm at 212 to predict or estimate georeferenced crop yield and soil test parameters. The application of Deep Learning Algorithm at 212 produces Prescription Recommendations, typically in the non-limiting format example of a table or map at 218. The application of Deep Learning Algorithm at 212 also provides input to the creation of Zone Attributes (B) to aggregate zones and attributes of zones at 224.

The compiled data of Data Cube (B) 210 data are also subject to an artificial intelligence unsupervised classification learning algorithm 214 and processed in order to delineate preliminary Zones at 216. Zone delineation effectiveness at 220 is evaluated based on how well the Zones capture the spatial variability in georeferenced soil-test data and crop yield. Zone delineation effectiveness at 220 may be calculated using real ground truth empirical provable data. Alternatively, Zone effectiveness delineation at 220 may be calculated using Deep Learning output from the application of Deep Learning Algorithms at 212. "Virtual agronomic effectiveness" of a delineation is based on the extent to which inter-zone differences are great enough to warrant differential variable-rate management. These judgements are made based on: 1) the likelihood of a response to differential management that is within the capabilities of the grower's variable rate application equipment, and 2) grower preferences. The system incorporates management "rules" at 222, and derives Aggregated Zone Attributes (B) for smoothed and aggregated zones that are consistent with the pre-established management rules at 224. The sub-process ends at 226.

Figure 3:
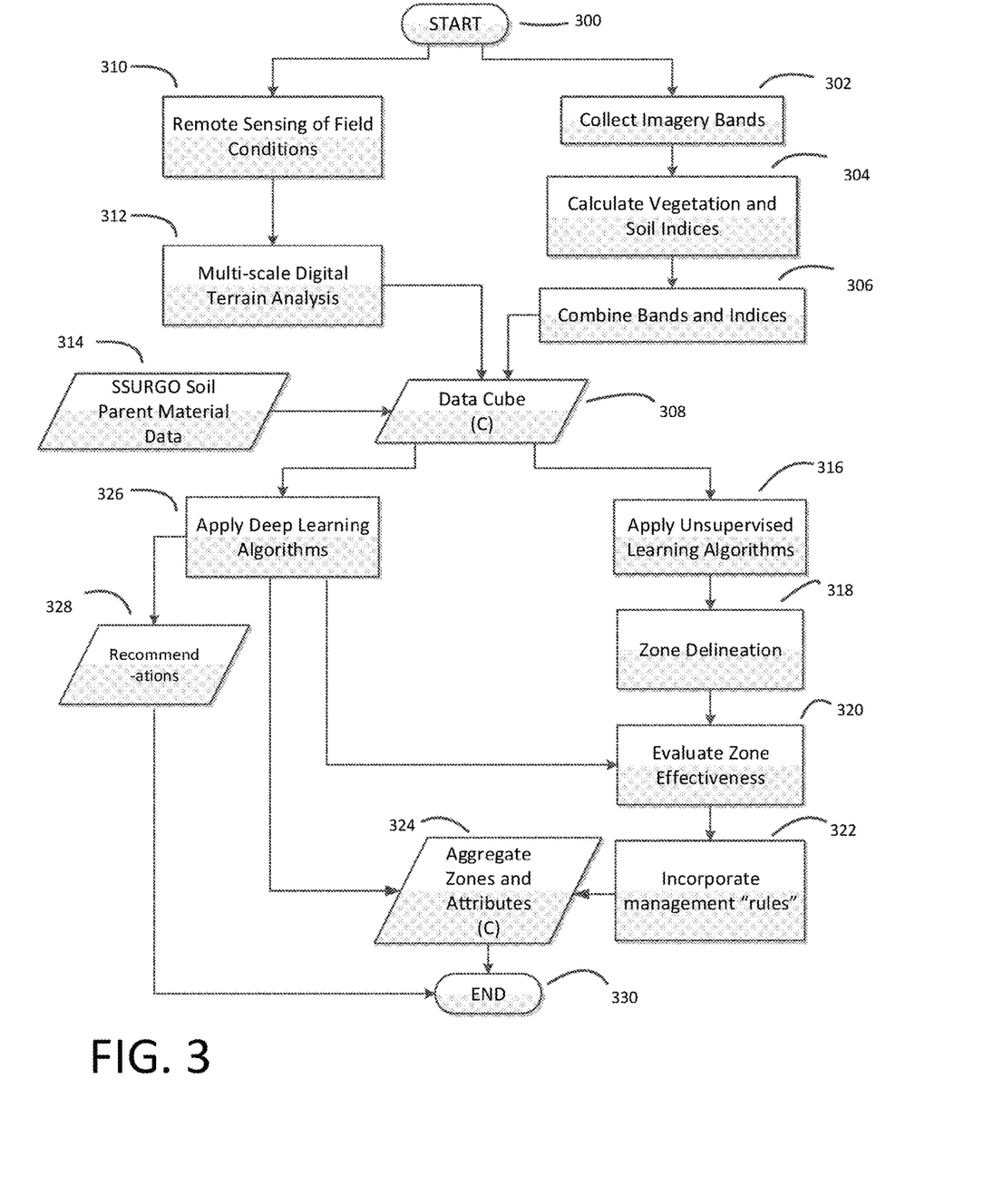
FIG. 3 is a third process-flow diagram showing the reduction of Zone Attributes and Prescription Recommendations consistent with certain embodiments of the present invention.

Turning now to FIG. 3, a third process-flow diagram showing the reduction of Zone Attributes and Prescription Recommendations consistent with certain embodiments of the present invention is shown. The sub-process of FIG. 3 begins at 300. At 310, LIDAR is used to provide remote sensing of field conditions. Multi-scale digital terrain analysis derivatives at 312 and Soil Parent Material Data at 314 augment the Data Cube (C) at 308 to train artificial intelligence deep learning prediction algorithms at 326 and delineate a third set of optimized agricultural zones at 324. Deep Learning Algorithms at 326 produce Prescription Recommendations at 328. Data Cube (C) 308 inputs data to Unsupervised Learning Algorithms at 316, leading to Zone Delineation at 318. At 320 the system evaluates for Zone Effectiveness with input from the Deep Learning Algorithms. At 322 the system incorporates management "rules" to determine Aggregated Zone Attributes (C) for smoothed and aggregated zones at 324. At 330 the sub-process ends.

The predictive values of Data Cube (A), Date Cube (B), and Data Cube (C) are compared statistically in order to choose the Data Cube (from the set of Data Cubes A, B, and C) that bests leads to prediction of any particular parameter of interest.

Figure 4:
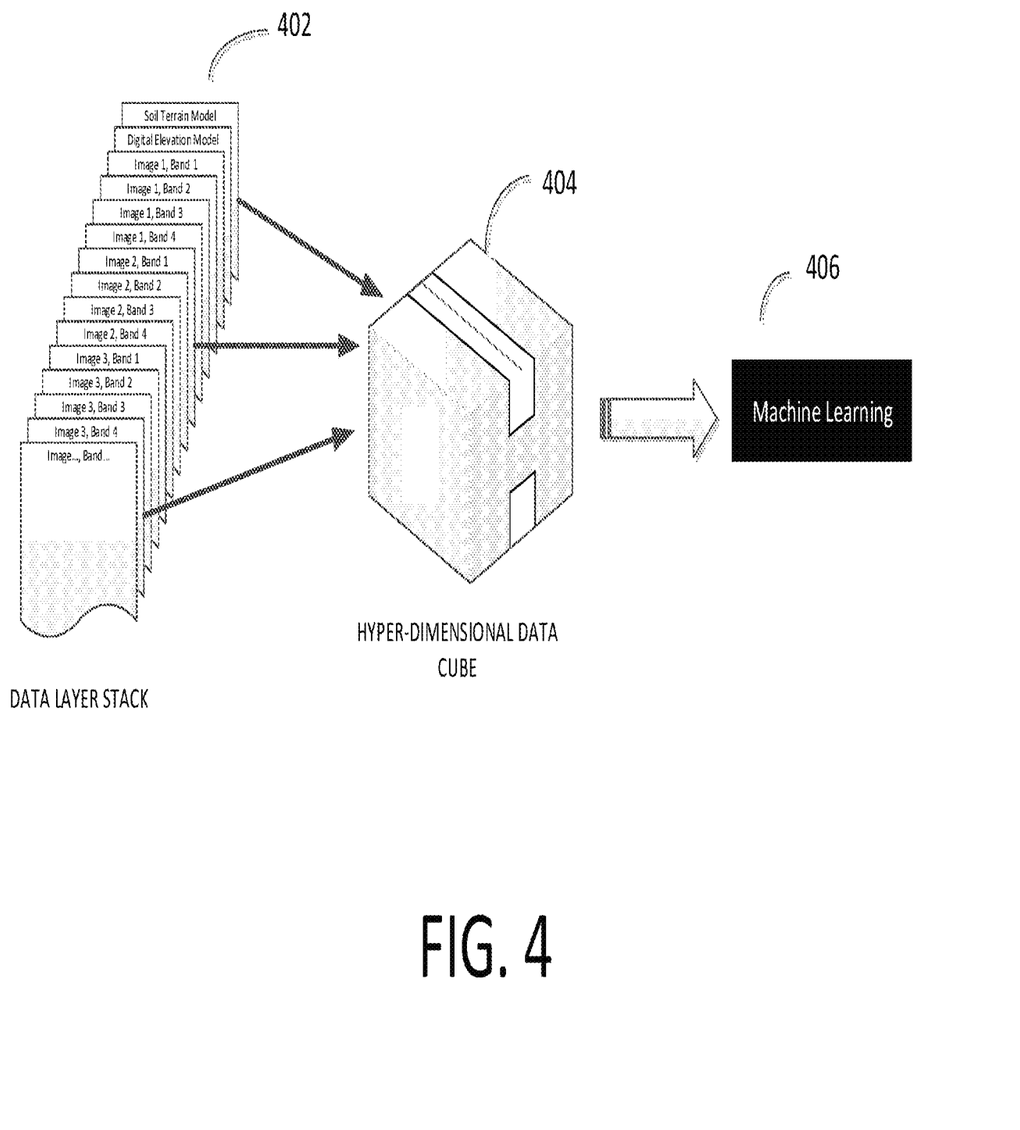
FIG. 4 is a view of a data stack's reduction to a machine-learning-ready data cube consistent with certain embodiments of the present invention.

Turning now to FIG. 4, a view of a data stack's reduction to a machine-learning-ready data cube consistent with certain embodiments of the present invention is shown. Each layer in the Data Layer Stack at 402 quantifies a single attribute. Attributes include: 1) topography as captured in the digital elevation model (DEM); 2) DEM derivatives such as the DTA; 3) individual spectral bands, for instance, in a non-limiting example, red, green, blue, near-infrared, hyperspectral, or any other provided image spectral band from satellite imagery; and 4) their derivative vegetation and soil indices. The Data Layer Stack 402 is combined to form a Hyper-dimensional Data Cube 404. The Hyper-dimensional Data Cube 404 is used to train artificial intelligence prediction algorithms at 406 and to delineate Zones via artificial intelligence unsupervised classification algorithms.

While certain illustrative embodiments have been described, it is evident that many alternatives, modifications, permutations, and variations will become apparent to those skilled in the art in light of the foregoing description.

We claim:

1. A system for optimizing agricultural zone attributes comprising:
   a data processor in communication with a data server;
   a user device, in communication with the data server, displaying data representations to a user from the following steps;
   constructing a first input dataset of geospatial images for the data processor from remote sensing of field conditions subjected to digital analysis, collected multi-temporal satellite or aerial imagery bands and calculated soil indices from the collected multi-temporal satellite or aerial imagery bands, and a SSURGO Soil Parent Material Data;
   training, by the data processor, a first soil property model with the first input data set using a supervised learning algorithm;
   generating, with the first soil property model by the data processor, predictions for a first soil property; and, in parallel, applying, by the data processor, an unsupervised artificial intelligence algorithm to the first input dataset, and
   outputting, by the data processor, a plurality of potential sets of management zones for the first soil property;
   geospatially joining, by the data processor, the predictions for the first soil property from the output of the first soil property model generated using the supervised learning algorithm with each of the plurality of potential sets of management zones generated from the unsupervised artificial intelligence algorithms;
   comparing, by the data processor, each of the plurality of potential sets of management zones that have been geospatially joined with the predictions for the first soil property from the output of the first soil property model to optimize intra-zone differences and maximize inter-zone differences of the first soil property; and
   wherein the data processor calculates a change in at least one set of soil zone attributes from an aggregated zone comprised of two or more of the plurality of potential sets of management zones and one or more zone patches and/or inclusions;
   wherein the data processor dissolves zone boundaries of the aggregated zone and the one or more zone patches and/or inclusions; and
   delivering, by the data processor, an optimized management zone for the first soil property to the user from the plurality of potential sets of management zones.

2. The system of claim 1, wherein the unsupervised artificial intelligence algorithms are Deep Learning algorithms, Unsupervised Learning algorithms, or a combination of Deep Learning and Unsupervised Learning algorithms.

3. The system of claim 1, wherein an evaluation of zone effectiveness incorporates ground truth or Deep Learning algorithm output.

4. A method for optimizing agricultural zone attributes comprising:
   constructing a first input dataset of geospatial images using remote sensing of field conditions subjected to digital analysis, collected multi-temporal satellite or aerial imagery bands and calculated soil indices from the collected multi-temporal satellite or aerial imagery bands, and SSURGO Soil Parent Material Data;
   training with the first input data set using supervised learning a first soil property model;
   generating predictions for a first soil property with the first soil property model; and, in parallel,
   applying an unsupervised artificial intelligence algorithm to the first input dataset, and outputting a plurality of potential sets of management zones for the first soil property;
   geospatially joining the predictions the predictions for the first soil property from the output of the first soil property model generated using the supervised learning algorithm with each of the plurality of potential sets of management zones generated from the unsupervised artificial intelligence algorithm;
   comparing each of the plurality of potential sets of management zones that have been geospatially joined with the predictions for the first soil property from the output of the first soil property model to optimize intra-zone differences and maximize inter-zone differences of the first soil property
   calculating a change in at least one set of soil zone attributes from an aggregated zone comprised of two or more of the plurality of potential sets of management zones and one or more zone patches and/or inclusions;
   dissolving zone boundaries of the aggregated zone and the one or more zone patches and/or inclusions; and
   delivering an optimized management zone for the first soil property to a user.

5. The method of claim 4, wherein an evaluation of zone effectiveness incorporates ground truth or Deep Learning algorithm output.

6. The method of claim 4, where the unsupervised artificial intelligence algorithms are Deep Learning algorithms, Unsupervised Learning algorithms, or a combination of Deep Learning and Unsupervised Learning algorithms.

7. The method of claim 4, where an evaluation of zone effectiveness incorporates ground truth or Deep Learning algorithm output.

* * * * *